United States Patent
Alexander et al.

(10) Patent No.: US 7,499,968 B1
(45) Date of Patent: Mar. 3, 2009

(54) SYSTEM AND METHOD FOR APPLICATION RESOURCE UTILIZATION METERING AND COST ALLOCATION IN A UTILITY COMPUTING ENVIRONMENT

(75) Inventors: Bruce D. Alexander, Louisville, CO (US); Jennie L. Simsick, Broomfield, CO (US); Rachelle A. Dillon, Arvada, CO (US); Jeffrey W. Giedt, Lakewood, CO (US); Margaret M. Mellott, Erie, CO (US); Jacqueline E. Wiles, Superior, CO (US); Tonya L. Olson, Lafayette, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 892 days.

(21) Appl. No.: 10/822,477

(22) Filed: Apr. 12, 2004

(51) Int. Cl.
G06F 15/16 (2006.01)
(52) U.S. Cl. .................. 709/203; 709/217; 709/226; 709/232; 705/412
(58) Field of Classification Search ............. 709/203, 709/217, 226, 232; 705/412
See application file for complete search history.

(56) References Cited

U.S. PATENT DOCUMENTS

| | | | | |
|---|---|---|---|---|
| 6,243,450 B1 * | 6/2001 | Jansen et al. | ........... | 379/144.01 |
| 6,266,817 B1 * | 7/2001 | Chaddha | ............ | 725/146 |
| 6,338,046 B1 * | 1/2002 | Saari et al. | ............ | 705/400 |
| 6,574,587 B2 | 6/2003 | Waclawski | | |
| 7,036,006 B2 | 4/2006 | Bandhole et al. | | |
| 7,080,116 B2 * | 7/2006 | Purpura | ............ | 709/203 |
| 2002/0152305 A1 | 10/2002 | Jackson et al. | | |
| 2002/0166117 A1 | 11/2002 | Abrams et al. | | |
| 2002/0188576 A1 * | 12/2002 | Peterson et al. | ............ | 705/400 |
| 2002/0194251 A1 | 12/2002 | Richter et al. | | |
| 2003/0046396 A1 | 3/2003 | Richter et al. | | |
| 2003/0145098 A1 * | 7/2003 | Litwin | ............ | 709/232 |
| 2004/0260652 A1 | 12/2004 | Rose | | |
| 2004/0267548 A1 | 12/2004 | Jones | | |
| 2005/0010667 A1 | 1/2005 | Moriki et al. | | |
| 2005/0066026 A1 | 3/2005 | Chen et al. | | |
| 2005/0097560 A1 | 5/2005 | Rolia et al. | | |
| 2005/0114274 A1 | 5/2005 | Dube et al. | | |
| 2005/0125314 A1 | 6/2005 | Agarwal et al. | | |
| 2005/0210245 A1 | 9/2005 | Rolia et al. | | |

(Continued)

OTHER PUBLICATIONS

Wheatley, Budgeting—Chargeback for Good or Evil, CIO Magazine, Mar. 1, 2003 (PDF Online).

(Continued)

*Primary Examiner*—Jinsong Hu
(74) *Attorney, Agent, or Firm*—Robert C. Kowert; Anthony M. Petro; Meyertons, Hood, Kivlin, Kowert & Goetzel, P.C.

(57) ABSTRACT

A system and method for application resource utilization metering and cost allocation in a utility computing environment. In one embodiment, the system may include a computational resource, a plurality of applications configured to utilize the computational resource, a metering utility configured to measure utilization of the computational resource by a given one of the plurality of applications, and a cost model configured to allocate a first portion of a cost of the computational resource to the given application dependent upon the measured utilization of the computational resource by the given application.

27 Claims, 6 Drawing Sheets

U.S. PATENT DOCUMENTS

2005/0210262 A1     9/2005    Rolia et al.
2005/0228850 A1    10/2005    Zhu et al.

OTHER PUBLICATIONS

Hoffman, "HP takes new pricing path for utility-based computing," Computerworld, May 26, 2003 (PDF Online).

Mearian, "Veritas redies tools to support utility computing," Computerworld, May 12, 2003 (PDF Online).

Albaugh et al., "The Utility Metering Service of the Universal Management Infrastructure," IBM Systems Journal, vol. 43, No. 1, 2004, (pp. 179-189).

Terence Kelly, "Internet Systems and Storage Laboratory," HP Laboratories Palo Alto, HP:-2003-115, Jun. 9, 2003.

\* cited by examiner

SYSTEM AND METHOD FOR APPLICATION RESOURCE UTILIZATION METERING AND COST ALLOCATION IN A UTILITY COMPUTING ENVIRONMENT

BACKGROUND OF THE INVENTION

1. Field of the Invention

This invention relates to computer systems and, more particularly, to metering utilization of computational resources by applications operating on computer systems.

2. Description of the Related Art

Many organizations rely on computer systems to provide services essential to their activities, such as email, office productivity and web-based services as well as more complex database and enterprise management services. In many cases, considerable expense is incurred in procuring and maintaining the hardware and software systems necessary to provide such services. However, such costs are often borne to a greater extent by the providers of computational services, rather than the consumers of such services. For example, within an organization, the costs of providing services may be budgeted to an information technology that may be the least active consumer of some of the provided services.

Requiring the service provider to shoulder the larger share of the cost of providing services has various disadvantages. Such a model may obscure the distinctions between resource consumers where significant distinctions in usage patterns may exist. Without a cost constraint on resource usage, consumers may be inclined to use resources indiscriminately. If the cost of such consumption is not related to the consumer in a direct way, such costs may not be fairly distributed. For example, if each organizational unit funds a common computer service infrastructure at a rate independent of service usage, such as a percentage of organizational unit revenue, then smaller service consumers may effectively subsidize larger ones.

SUMMARY

Various embodiments of a system and method for application resource utilization metering and cost allocation in a utility computing environment are disclosed. In one embodiment, the system may include a computational resource, a plurality of applications configured to utilize the computational resource, a metering utility configured to measure utilization of the computational resource by a given one of the plurality of applications, and a cost model configured to allocate a first portion of a cost of the computational resource to the given application dependent upon the measured utilization of the computational resource by the given application.

In one specific implementation of the system, the cost model may be further configured to allocate a second portion of the cost of the computational resource to the given application as a fixed cost not dependent upon the measured utilization of the computational resource by the given application. In another specific implementation of the system, the first and second portions may total one hundred percent of the cost, and subject to this constraint, the first and second portions may each comprise from zero percent to one hundred percent of the cost.

A method is further contemplated that in one embodiment may include a plurality of applications utilizing a computational resource, measuring utilization of the computational resource by a given one of the plurality of applications, and allocating a first portion of a cost of the computational resource to the given application dependent upon the measured utilization of the computational resource by the given application.

Figure 1:
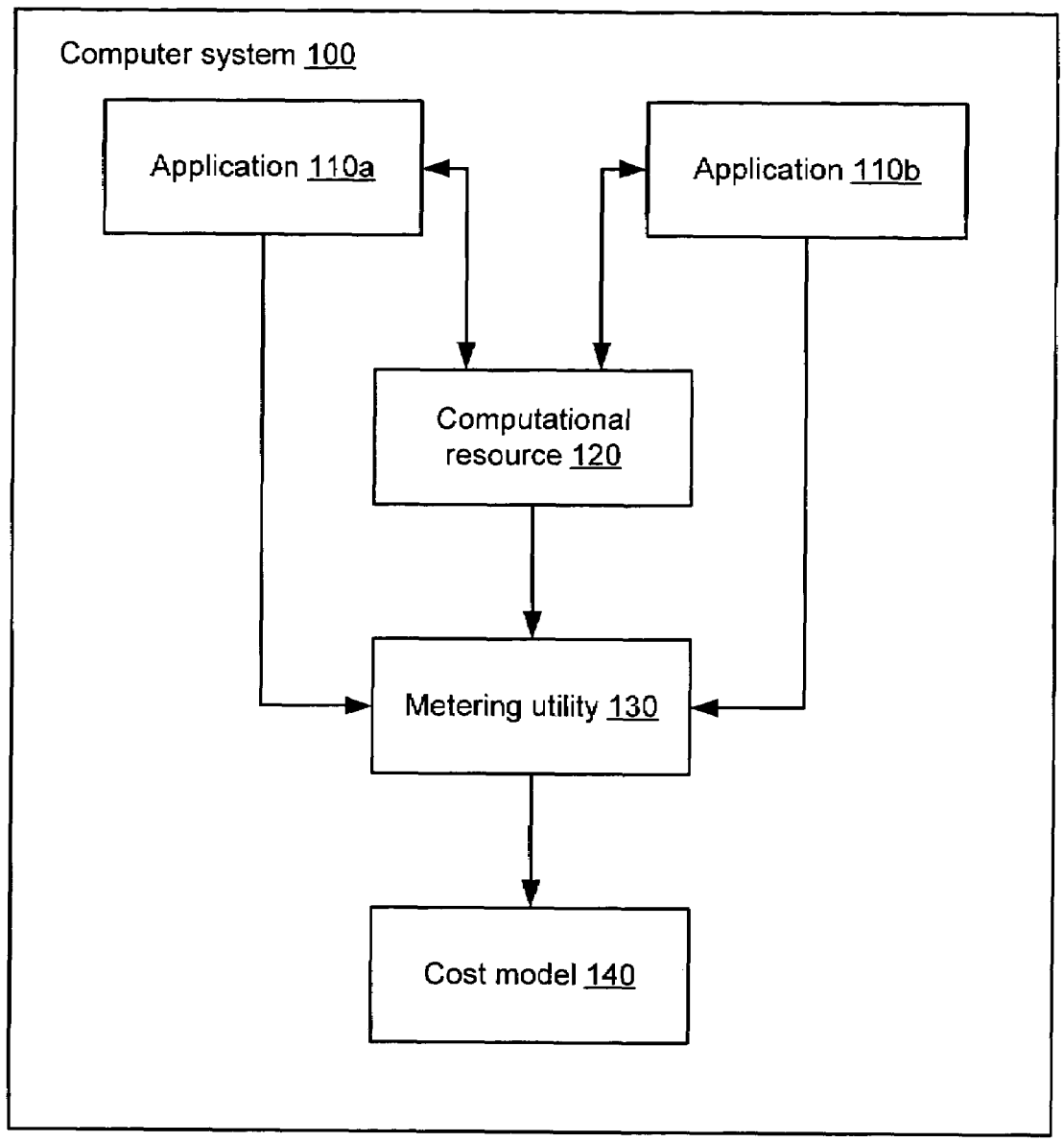
FIG. 1 is a block diagram illustrating one embodiment of a computer system configured to execute applications.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview of Utility Computing Environment

Turning now to FIG. 1, a block diagram illustrating one embodiment of a computer system is shown. In the illustrated embodiment, computer system 100 is configured to execute a plurality of applications 110*a-b*, each of which is configured to utilize a computational resource 120. Computer system 100 is further configured to execute a metering utility 130, which may be configured to measure the utilization of computational resource 120 by each of applications 110 and to convey such measurements to a cost model 140.

Figure 6:
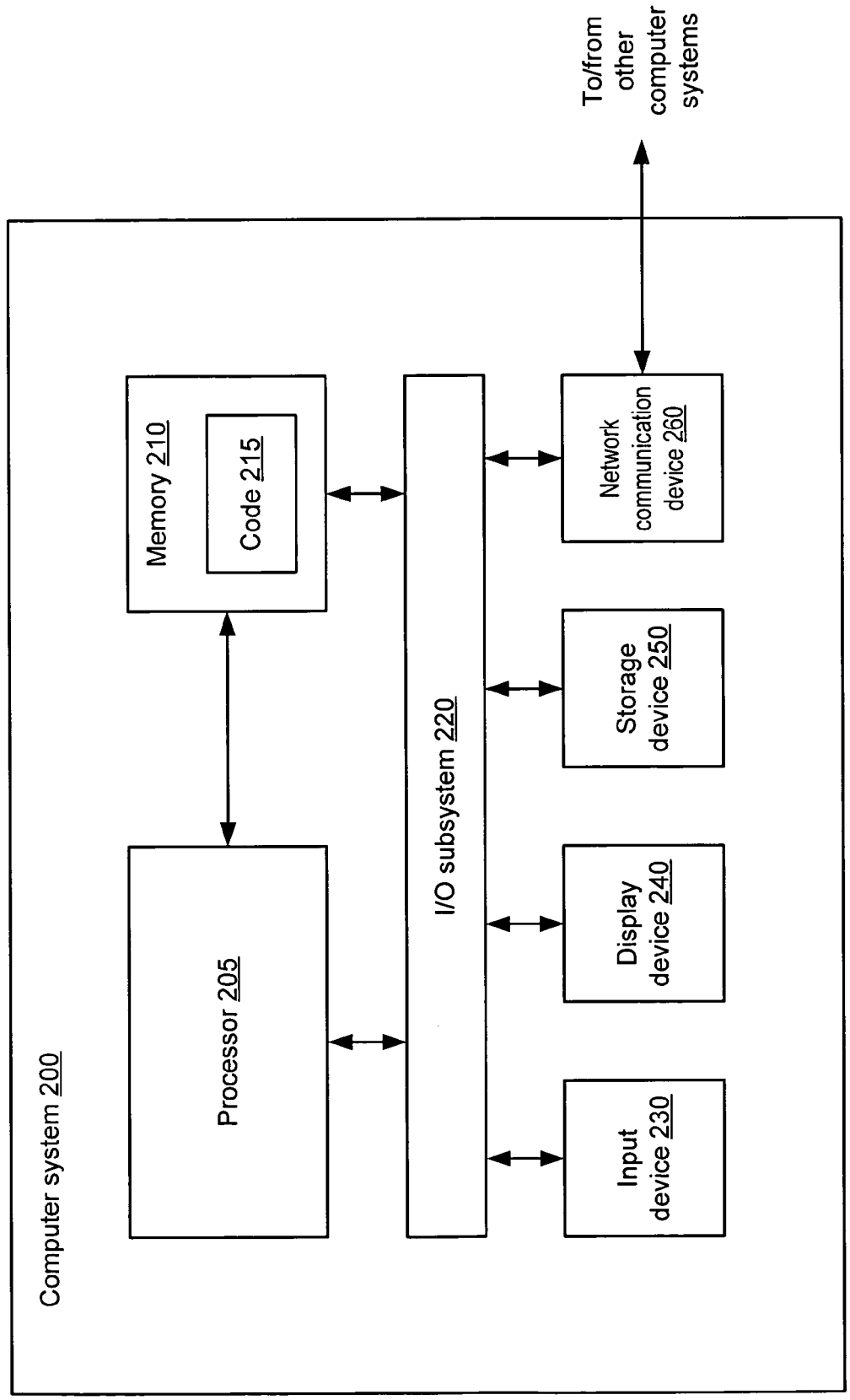
FIG. 6 is a block diagram illustrating one detailed embodiment of a computer system including computational resources that may be utilized by applications.

Computer system 100 may be any type of computer system capable of executing program instructions comprising software functionality. In various embodiments, computer system 100 may be a server system (including blade and rackmountable servers), a client system (including desktop and thin clients), an embedded system, a handheld system, or any other suitable type of computer system. A system embodiment exemplary of computer system 100 is described in greater detail below in conjunction with the description of FIG. 6.

Applications 110*a-b* may be any type of program executable on computer system 100 and configured to utilize computational resource 120. In various embodiments, applications 110 may include office-type applications such as word processors and spreadsheets, database applications such as user interfaces, query engines, and data stores, web-based applications including Java applications, multimedia applications, custom-developed applications, or any other suitable type of application. In some embodiments, a given application 110 may include multiple executable entities such as processes or threads, or multiple instances of a given application 110 may be operative within computer system 100 at a given time. It is noted that in some embodiments, an arbitrary number of applications 110 may be provided.

Computational resource 120 may be any element of computer system 100 configurable to perform a function on behalf of one or more of applications 110. Such functions may include, without limitation, processing, storage, and communication functions. For example, as described in greater detail below, computer system 100 may include processing resources such as one or more microprocessors, digital signal processors, or dedicated processors such as application specific integrated circuits (ASICs), field programmable gate arrays, (FPGAs), or the like, any of which may be utilized by a given application 110 to perform a computational function such as executing program instructions. Additionally, computer system 100 may include storage resources such as system memories, magnetic storage media (e.g., hard disks), optical storage media (e.g., CD, DVD), or solid-state storage media (e.g., nonvolatile RAM), any of which may be configured to store data or instructions on behalf of a given application 110. Computer system 100 may also include communication resources such as network interfaces (e.g., wired or wireless interfaces using Ethernet or another protocol), analog telephony modems, or any other type of communication resource that may be configured to transmit or receive data on behalf of a given application 110. Any of these processing, storage or communication resources may be illustrative of computational resource 120, and it is contemplated that in some embodiments, computer system 100 may include an arbitrary number of such computational resources 120 in any combination.

In the illustrated embodiment, computational resources 120 may be treated as a quantifiable resource that may be utilized by a consumer (i.e., an application 110) in a manner analogous to the consumption of resources such as electricity or water, or of other metered resources. Such an embodiment may be referred to as a utility computing environment, and metering utility 130 may be a software utility configured to measure the utilization of computational resource 120 by applications 110. For example, where computational resource 120 provides a processing function as described above, metering utility 130 may be configured to measure processing utilization by applications 110 in units of time (e.g., central processing unit (CPU) seconds, minutes, hours, etc.), in units of processing work (e.g., number of processor cycles), or another measure of processing utilization. Similarly, utilization of a storage instance of computational resource 120 may be measured in terms of storage per unit of time (e.g., gigabytes per day (GB/day)), average or peak storage bandwidth (e.g., accesses per second, megabytes per second (MB/s)), or any other measure of storage utilization. Communication resources utilization may likewise be measured in terms of average or peak communications bandwidth (e.g., megabits per second (Mb/s), total quantity of data transferred (e.g., MB, GB), or any other measure of communications utilization.

Metering utility 130 may employ any of a number of methods to perform the aforementioned utilization measurements. In some embodiments, metering utility 130 may measure resource utilization by accessing operating system constructs such as process tables, for example. In other embodiments, metering utility 130 may be configured to interact directly with a particular computational resource 120 to determine its utilization, for example by reading a counter or timer implemented within the resource. In embodiments where a given application 110 encompasses several constituent processes or threads, each of which may separately utilize a given computational resource 120, metering utility 130 may in one embodiment aggregate each constituent entity's utilization of given computational resource 120 into a single resource utilization metric for given application 110. Alternatively, in one embodiment metering utility 130 may be configured to track and indicate utilization by each constituent entity of given application 110 separately. In some embodiments, metering utility 130 may be configured to measure utilization of resources by applications 110 transparently to those applications, i.e., without interfering with the operation or configuration of applications 110. Also, in some embodiments, metering utility 130 may be configured to measure its own utilization of a given computational resource 120.

Cost model 140 may be a software program configured to allocate a portion of the cost of providing a given computational resource 120 to the various applications 110 that utilize such a resource. As described in greater detail below, in some embodiments cost model 140 may support a number of different methods of allocating resource costs to applications 110. In various embodiments, cost model 140 may also be configured to assist in determining the total cost to allocate among applications 110, and/or to generate billing information specific to the resource utilization of each application 110.

In some embodiments, tracking the utilization of various computational resources may be provided within a networked computer system. In one such embodiment, illustrated in FIG. 2, a plurality of computer systems 100a-e are interconnected via an interconnect medium 15. In the illustrated embodiment, each of computer systems 100a-e includes a respective computational resource 120a-e and a respective instance of metering utility 130a-e. Computer system 100a includes applications 110a-b, computer system 100b includes cost model 140, computer system 100c includes a web server 160, computer system 100d includes an application 110c, and computer system 100e includes a database 150. Each of computer systems 100a-e may be illustrative of computer system 100 of FIG. 1, with the exception that in the illustrated embodiment, cost model 140 is configured to operate on computer system 100b, and metering utilities 130a and 130c-e are configured to interact with cost model 140 via interconnect medium 15. In various embodiments, computer systems 100a-e may include different numbers and kinds of applications 110 and computational resources 120. Communication relationships among applications 110, computational resources 120, and metering utility instances 130 may be as illustrated in the embodiment of FIG. 1, but have been omitted from FIG. 2 for clarity.

Figure 2:
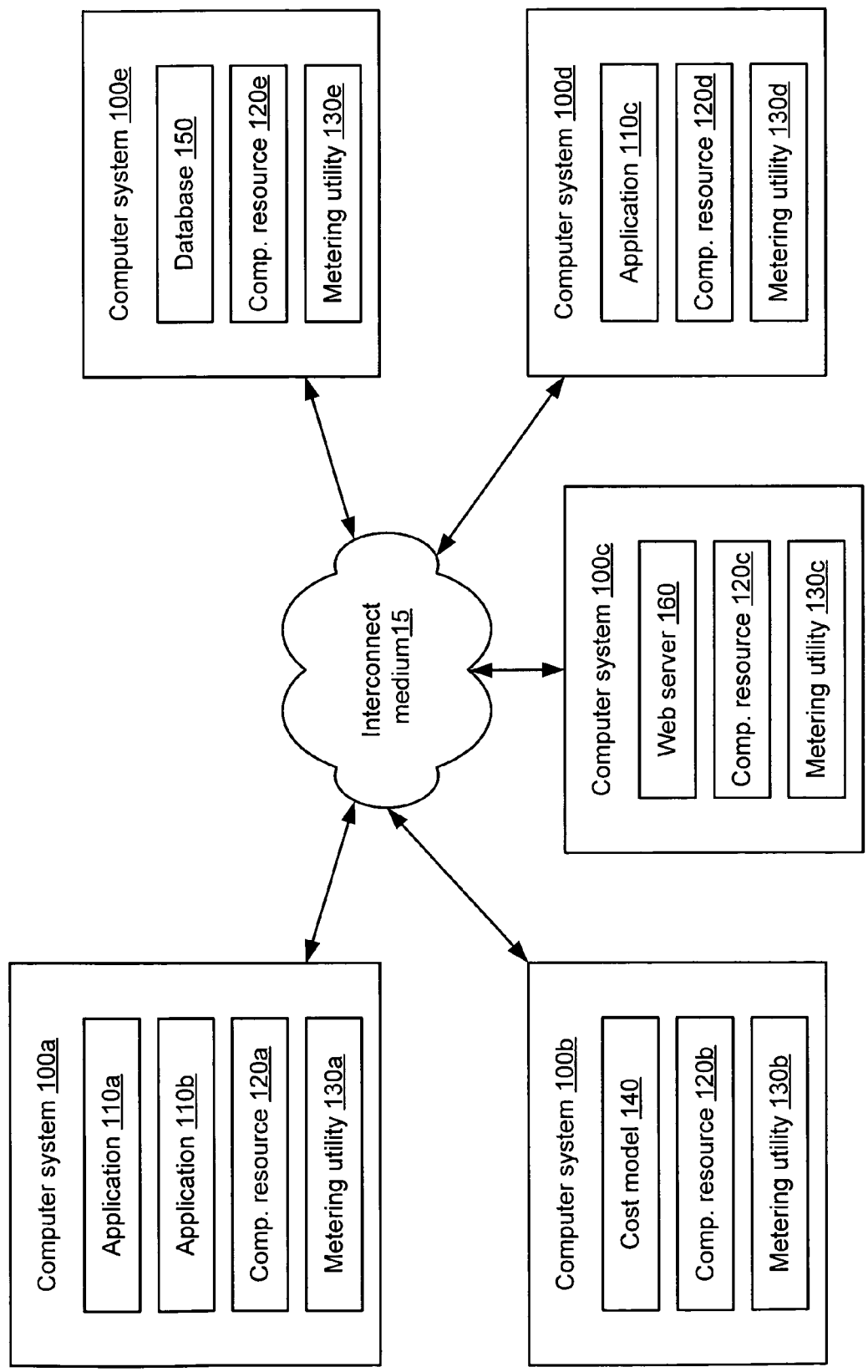
FIG. 2 is a block diagram illustrating one embodiment of a networked computer system configured to execute applications.

In the embodiment of FIG. 2, interconnect medium 15 may be any type of network interconnect, including a local area network (LAN), a wide area network (WAN), or a combination of these, operating on any suitable medium such as electrical cable, optical fiber, wireless/radio frequency signaling, or a combination of these. Interconnect medium 15 may in various embodiments include devices such as switches, hubs, routers, multiplexers, demultiplexers, and/or portions of public or private telecommunications networks.

Database 150 may be configured to provide database services to one or more of computer systems 100a-e. Like any of applications 110, database 150 may utilize one or more computational resources 120e within its host computer system 100e. Correspondingly, metering utility 130e may be configured to measure utilization of resources by database 150 in a manner similar to that described above for an application 110. Similarly, web server 160 may be configured to provide web hosting services to computer systems 100a-e, may utilize computational resources 120c within its host computer system 100c, and may have its utilization measured by metering utility 130c. Generally, metering utility instances 130a-e may be configured to measure resource utilization by any executable software operating on respective computer systems 100a-e, and to communicate their measurements to cost model 140 for cost allocation.

Cost Determination

As previously mentioned, in one embodiment cost model 140 may be configured to allocate a portion of the cost of providing a given resource to an application dependent upon the resource utilization of that application. In one embodiment, the total cost of providing computational resources may first be determined prior to any allocation of costs to applications. The total cost may then be used as a primary input to any of numerous possible cost recovery models, as described in further detail below.

In some embodiments, the cost to an application for a unit of resource utilization may be determined by fiat, by a rough estimate of what such a resource costs to provide, by a competitor's comparable charge, or by another form of general approximation. However, none of these approaches may adequately reflect the true cost of resources to their provider. Consequently, a customer being charged for resource utilization may object that the charge is unjustifiable or arbitrary.

Figure 3:
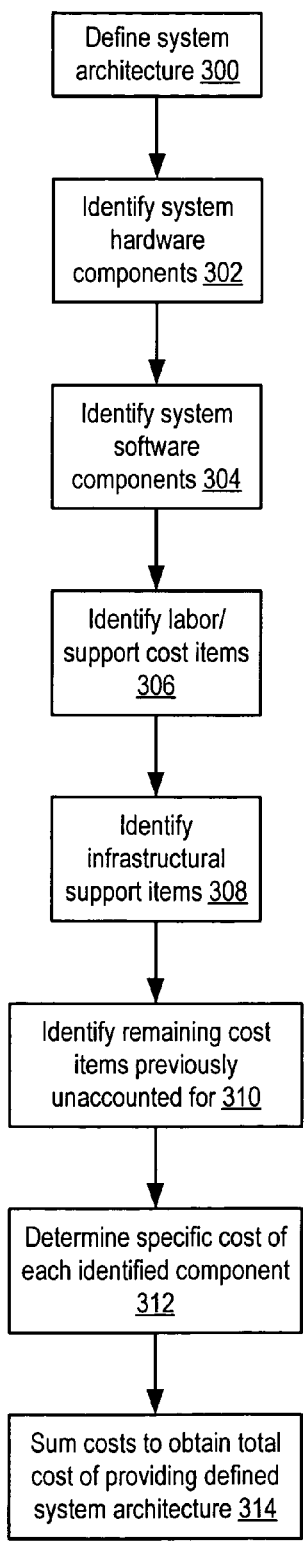
FIG. 3 is a flow diagram illustrating one embodiment of a method of determining a total cost of providing computational resources.

One embodiment of a method of determining a total cost of providing computational resources is illustrated in FIG. 3. First, the system architecture of the resource environment to be provided is defined, where the architecture may include both the software components (e.g., applications, operating systems) and hardware components (e.g., computer systems, peripherals, networking components) (block 300). For example, in one embodiment a customer may provide a specification detailing the application support to be provided, as well as various expectations regarding the quality of service of provided to a given application. Quality of service may generally encompass factors such as application availability, reliability, performance, for example. The specification may be used to develop a system architecture. For example, if the customer specifies that certain applications be highly available in the event of system failure, redundant computer systems 100 may be dedicated to those applications. Similarly, if high performance is specified for a particular application, a well-tuned server system with a faster processor, more system memory, etc. may be provisioned for that application.

Once the system architecture has been defined, the hardware components comprising the system are identified (block 302). In one embodiment, identified hardware components may be categorized into server systems, client systems (e.g., desktop systems), network hardware (e.g., routers, switches), and storage systems separate from other systems (e.g., storage area network (SAN), standalone storage systems, tape drives). Different categories may be defined in different embodiments, and components that do not fit a particular category may be individually identified.

Software components comprising the system are also identified (block 304). In one embodiment, initial licensing requirements for each application may be identified, as well as any planned software maintenance and upgrades. The components to be used for metering and cost modeling may also be identified.

Labor and system support cost items are also identified (block 306). In one embodiment, labor associated with initial configuration of the system as well as ongoing administration of the system (including tasks such as performing data backups, administering databases, etc.) may be identified. Support cost items may include providing a help desk to field customer requests for assistance and to respond to reports of trouble. Support cost items may further include agreed levels of hardware and software service (such as guaranteed levels of response and repair time). In various embodiments, personnel effort may be quantified in terms of contractor hours, full-time equivalent (FTE) personnel, or any other suitable metric. In some embodiments, training needs may also be identified.

Infrastructural support items are also identified (block 308). For example, depending on the complexity of the hardware components previously identified, the level of service specified by the customer, and other factors, specific heating/cooling, floor space, and electrical power requirements may be identified. Such requirements may be divided into initial configuration items (e.g., installation of air or power conditioning equipment) and recurrent items (e.g., monthly electrical consumption). If network connectivity is required to be provided by an external provider (e.g., a telecommunications company), associated configuration and recurrent items may be included in this category.

Any additional cost-related items not previously accounted for may be separately identified (block 310). Once each system component potentially incurring a cost has been identified, the specific cost associated with each component is determined (block 312). For example, certain hardware and software costs may be determined by contractual purchase and support agreements with vendors. Some recurrent costs, such as for power, may be estimated using historical data for similar system configurations, or by estimating recurring resource requirements and using rate information from providers. Specific experts in certain functional areas (such as system administration, for example) may be contacted to obtain estimates for more subjective items, such as labor costs for configuration and support.

Finally, identified costs may be summed to obtain a total cost of providing the defined system architecture (block 314). The resulting total may be comprehensive, in that both direct costs of providing computational resources 120, such as costs of hardware and software, as well as indirect costs of providing computational resources 120, such as costs of labor, support and infrastructure, may be reflected in the total. Consequently, the resulting total may be defensible to a customer who may question how costs were determined.

In one embodiment, cost model 140 may be configured to implement the foregoing cost-identification process. For example, cost model 140 may interactively present tables or forms including lists of possible cost items for a user to identify as pertinent to a particular system architecture being provisioned. Cost model 140 may additionally maintain cost information for various items, such as in a database, and may allow a user to override such cost information or to provide information for items not known to cost model 140. In other embodiments, the cost identification process may be performed manually, for example using paper forms, spreadsheets, or other suitable tools. Also, it is noted that in various embodiments steps 302-310 may be performed in any order, or the cost determination step 312 may be interspersed with or incorporated into the cost item identification steps 302-310.

Billing Models

Figure 4:
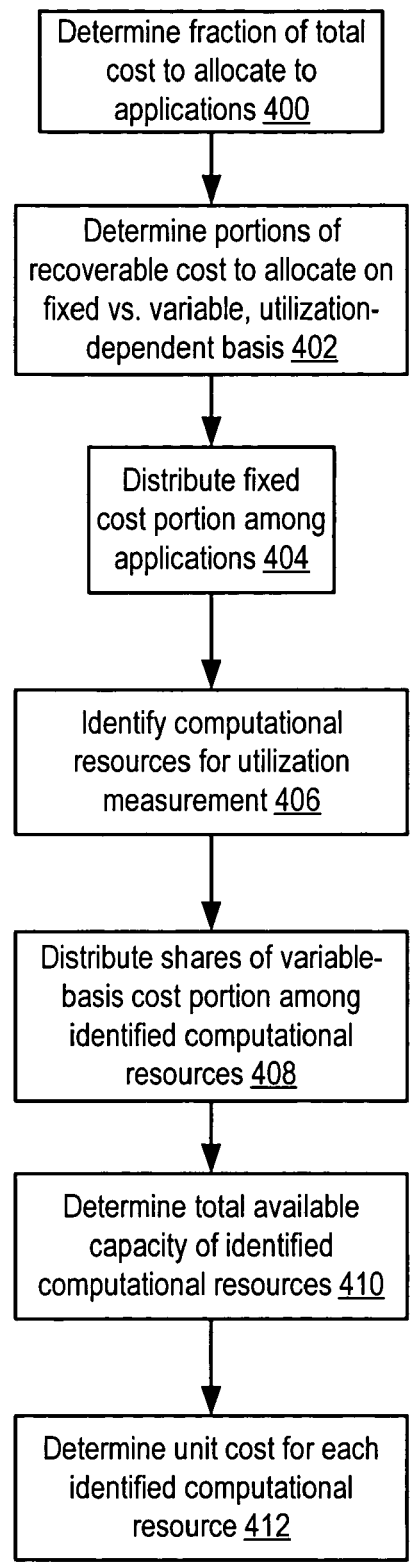
FIG. 4 is a flow diagram illustrating one embodiment of a method of determining a billing model for computational resource utilization.

Once a total cost of providing computational resources 120 in a given system architecture has been determined, for example using the method illustrated in FIG. 3, a particular billing model through which some or all of the total cost may be mapped to the various provided applications 110 may be determined. One embodiment of a method for determining a billing model for computational resource utilization is illustrated in FIG. 4. Referring collectively to FIG. 1 and FIG. 4, operation begins in block 400 where the fraction of the total cost to be allocated to applications 110 is determined. This fraction may also be referred to as the total recoverable cost. For example, in one embodiment, the entire cost of computational resources 120 may be allocated directly to applications 110 without profit margin expectations, in which case the total recoverable cost allocated to applications 110 is 100% of the total cost. In other embodiments, if a profit or discount on providing computational resources 120 is desired, this fraction may be higher or lower than 100%, respectively.

Subsequently, the portions of the total recoverable cost to be allocated to each of applications 110 on a fixed basis versus a variable, utilization-dependent basis is determined (block 402). In one embodiment, fixed costs may be allocated among applications 110 independent of resource utilization, while variable costs may be allocated dependent upon resource utilization, as described below. For example, a provider of computational resources 120 may wish to be assured of billing at least 20% of the total recoverable costs to applications 110 regardless of how actively applications 110 utilize computational resources 120. In such a case, the provider may determine that 20% of the total recoverable cost is to be allocated to applications 110 on a fixed basis, and 80% of the total recoverable cost is to be allocated to applications 110 on a variable basis. In one embodiment, the portion of total recoverable cost not allocated on a fixed basis is allocated on a variable, utilization-dependent basis. In such an embodiment, allocations may range from 100% fixed and 0% variable to 0% fixed and 100% variable, in any suitable combination totaling 100% of the total recoverable cost.

The portion of the total recoverable cost allocated to each of applications 110 on a fixed basis is then distributed among applications 110 (block 404). For example, in one embodiment the fixed portion may be equally distributed among all applications 110. In another embodiment, the fixed portion may be distributed in a weighted fashion among applications 110. For example, a given application 110 may be classified by quality of service (such as mission critical/high availability, business critical/normal availability, noncritical), by size/complexity (such as large, medium, small), by type (multimedia, database, office application) or by some other type of classification. Weights may then be assigned to the various application classes, such that more heavily weighted applications 110 incur a greater share of the fixed portion of the total recoverable cost than more lightly weighted applications 110. Numerous distributions of the fixed portion of the total recoverable cost to each of applications 110 are possible and contemplated.

For the variable-basis portion of the total recoverable cost, the particular computational resources 120 for which instances of metering utility 130 are to measure utilization are defined, and the specific utilization measurements are identified (block 406). Further, the distribution of the variable-basis portion of the total recoverable cost among the defined computational resources 120 is determined, such that each defined computational resource 120 bears a respective share of the variable-basis portion of the total recoverable cost (block 408). For example, in one embodiment, processor- and storage-type computational resources 120 may be selected for measurement. As noted above, different types of utilization measurements for these types of resources may be possible, such as storage quantity and storage bandwidth for a storage-type resource. In this example, processor minutes and storage quantity (e.g., in MB) utilized over the course of a given period of measurement (e.g., a month) may be the utilization measurements selected. Further, the variable-basis portion of the total recoverable cost may be equally distributed among measured processor minutes and measured storage quantity (i.e., 50% processor, 50% storage). It is contemplated that in various embodiments, other combinations of computational resources 120 may be selected for measurement, and other types of utilization measurements for the selected resources may be used. In some embodiments, several types of utilization for a single computational resource 120 may be measured and used (e.g., storage quantity and bandwidth for a storage-type resource). It is also contemplated that any suitable distribution of variable-basis costs among the selected utilization measurements may be employed.

For each of the computational resources 120 for which a utilization measurement has been selected, a total available capacity of the resource relevant to the utilization measurement is determined (block 410). Referring to the previous example where processor minutes and storage quantity are selected, the total number of processor minutes available during a given utilization measurement period may be determined from the number of hours and days the processor resources are available as well as the number of processor resources provided. Similarly, the total available storage resource capacity in MB may be determined. In some embodiments, the total available capacity of a given computational resource 120 may reflect the application of an expected utilization factor to the total capacity of the given resource. For example, not all processor minutes or megabytes of storage may be available for use by applications 110; operating system activities and other types of overhead may consume some of these resources. In such cases, an expected utilization factor corresponding to the fraction of a given resource expected to be available to applications 110 (e.g., 70% of total processor minutes, 80% of total storage) may be applied to the total capacity of the given resource.

Once the distribution into shares of the variable-basis portion of the total recoverable cost among the various measured computational resources 120 has been determined, and the total available capacity of each measured computational resource 120 has been computed, a respective unit cost for each of computational resources 120 is determined (block 412). For example, if $10,000/month of the total recoverable cost has been distributed to processor utilization, and 1,000,000 processor minutes are available in a given month, the unit cost for processor utilization may determined by the simple ratio of these items, or $0.01 per processor minute per month. In some embodiments, the unit costs of resource utilization may be scaled by weighting factors associated with the various types of applications 110, similar to the weighting factors used in distribution of fixed costs as described above. For example, unit costs may be scaled for a given application dependent upon its quality of service, or another factor.

In one embodiment, cost model 140 may be configured to implement the method just described. For example, cost model 140 may present a user interface whereby an administrator may enter parameters corresponding to the various factors described above. In other embodiments, the method just described may be performed manually or by another program, such as a spreadsheet, and the computational resources 120 selected for utilization measurement and corresponding unit costs may be conveyed to cost model 140 and the instances of metering utility 130 for measurement. Also, it is noted that in some embodiments, step 404 may be performed at any time after the fixed-basis portion has been determined, and that steps 408-410 may be performed in any order.

In one detailed example of the application of the method of FIG. 4, the total cost to provide a system including 8 processors and 2 terabytes (2 TB, i.e., 2,048,000 MB) of storage as computational resources 120 to 19 individual instances of applications 110 may be determined to be $215,000 per year, or $17,917 per month. Such a total cost may be determined, for example, by applying the method illustrated in FIG. 3. (For simplicity, all results except the final unit rates will be rounded to the nearest whole value.)

Proceeding through steps 400-404, it may be determined that 100% of the total cost is to be allocated to the 19 applications each month, that 20% of the total cost is to be allocated on a fixed basis and evenly distributed to the 19 applications, and that 80% of the total cost is to be allocated on a variable basis dependent upon resource utilization. Evenly distributing 20% of the $17,917 monthly total cost to each of the 19 applications yields a fixed cost portion of $189 per application per month, which may be billed to each of applications 110 regardless of their utilization of computational resources 120.

Proceeding through steps 406-412, for the variable-basis portion of total cost allocation, it may be determined that processor resource utilization may be measured in processor minutes and storage resource utilization in MB, with the variable-basis portion evenly divided between the two (i.e., 50% processor, 50% storage, $7167/month for each). Total available capacity of processor minutes per month, assuming 70% availability of processor minutes for applications 110, 8 processors, and 31-day months, may be determined to be 249,984 processor minutes. Total available storage capacity, assuming 80% availability of storage capacity for applications 110, may be determined to be 1,638,400 MB. Unit rates for processor and storage resources may be determined by dividing each of these capacities into their respective shares of the variable-basis portion of costs, yielding rates of $0.029 per processor minute per month and $0.0044 per MB per month.

Figure 5:
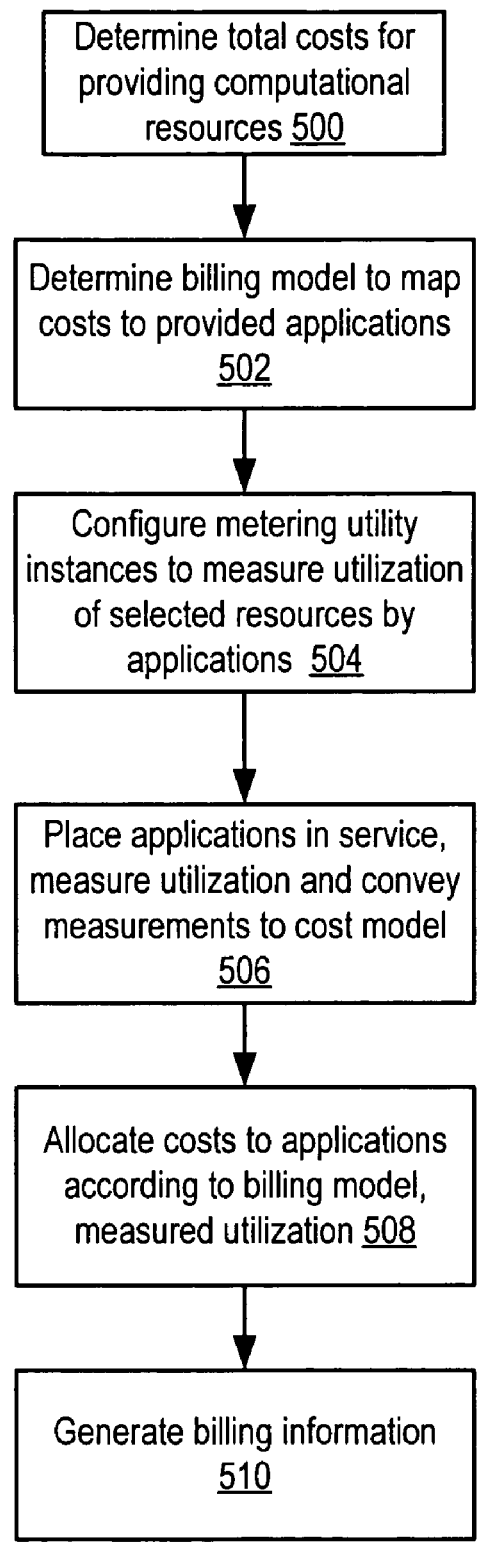
FIG. 5 is a flow diagram illustrating one embodiment of a method of using a cost model to allocate costs to an application dependent on that application's measured utilization of a resource.

One embodiment of a method of using a cost model to allocate costs to an application dependent on that application's measured utilization of a resource is illustrated in FIG. 5. Referring collectively to FIGS. 1-5, operation begins in block 500 where total costs for providing computational resources 120 are determined. For example, a method for identifying and quantifying cost items such as the one illustrated in FIG. 3 may be employed, either manually or through cost model 140. Subsequently, a billing model may be determined in which all or a portion of total costs are mapped to the various provided applications 110 (block 502). For example, the method for deriving a billing model as illustrated in FIG. 4 may be employed, either manually or through cost model 140.

Once a billing model is obtained, instances of metering utility 130 are configured to measure utilization of the selected computational resources 120 (such as processor minutes and storage space in the previous example) for each of applications 110 on all computer systems 100 hosting such applications (block 504). Additionally, cost model 140 is configured with unit rates for resource utilization as well as data identifying the various applications 110 being measured. For example, cost model 140 may be configured with billing contact information for each application 110. (In embodiments where cost model 140 is configured to participate in cost identification and/or billing model generation, it may obtain some or all of its configuration items from these processes.)

Following configuration of metering utility 130 instances and cost model 140, applications 110 are placed in service and one or more instances of metering utility 130 begin measuring their resource utilization, conveying measurements to cost model 140 (block 506). In some embodiments, each instance of metering utility 130 may be configured to send utilization measurements to cost model 140 continuously (i.e., as measurements are made), while in other embodiments, such measurements may be internally queued and sent at intervals.

Cost model 140 aggregates measurements of resource utilization conveyed from instances of metering utility 130 and allocates costs to each application 110 according to the defined billing model and measured resource utilization (block 508). Using the previous example, if cost model 140 receives a measurement from a metering utility 130 indicating that a given application 110 has utilized 10 processor minutes, a $0.29 charge may be allocated to given application 110.

At some interval, such as monthly or quarterly, cost model 140 causes billing information to be generated based on costs allocated to each application 110 (block 510). For example, if a fixed-basis cost component is defined within the billing model, the identified fixed cost may be charged against each application 110, as may any utilization-based costs allocated by cost model 140 since the last bill generation. In some embodiments, cost model 140 may be configured to generate billing information directly, whereas in other embodiments, cost model 140 may convey billing data to a separate application configured to generate bills.

Exemplary Computer System

One detailed embodiment of a computer system including computational resources that may be utilized by applications, as described above, is shown in FIG. 6. Computer system 200 may be illustrative of any of the instances of computer system 100 or 100a-e shown in FIGS. 1 and 2. Additionally, any of the hardware elements shown within computer system 200 may be illustrative of computational resource 120. In the illustrated embodiment, computer system 200 includes processor 205 coupled to memory 210. Both processor 205 and memory 210 are coupled to a variety of devices via input/output (I/O) subsystem 220, including input device 230, display device 240, storage device 250, and network interface device 260.

Processor 205 may be configured to execute program instructions stored in memory 210 or received via I/O subsystem 220. In one embodiment, processor 205 may be a microprocessor configured to implement a given instruction set architecture (ISA), such as the SPARC ISA or the x86 ISA, for example. In another embodiment, processor 200 may be a digital signal processor, while in still another embodiment, processor 205 may be an integrated device such as a microcontroller. In some embodiments, processor 205 may include an integrated memory controller (not shown) enabling it to couple directory to memory such as memory 210, whereas in other embodiments, processor 205 may couple to memory via a separate interface (e.g., a north bridge) or via I/O subsystem 220.

Memory 210 may be configured to store program instructions and data during operation of computer system 20. In various embodiments, memory 210 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or Rambus DRAM (RDRAM), for example. Memory 210 may also include nonvolatile memory technologies such as nonvolatile "flash" RAM (NVRAM) or read-only memory (ROM). In some embodiments, it is contemplated that memory 210 may include a combination of technologies such as the foregoing, as well as other technologies not specifically mentioned. In the illustrated embodiment, memory 210 includes software code 215, which may include program instructions and data corresponding to one or more of the applications 110, metering utility 130 and cost model 140, database 150, and web server 160 shown in FIGS. 1 and 2. Code 215 may also include program instructions and data corresponding to other application or operating system software modules.

I/O subsystem 220 may be configured to interface various peripheral devices to processor 200 and to memory 210. In one embodiment I/O subsystem 220 may include logic and interconnect devices configured to implement a bus interconnect standard such as the peripheral component interconnect (PCI) bus standard, although in other embodiments other bus interconnect types or a combination of such types may be supported. In some embodiments, I/O subsystem 220 may include logic configured to support direct memory access (DMA) transfers between peripheral devices and memory 210.

Input device 230 may be configured to receive input from one or more users of computer system 200 and to deliver such input to processor 205 and/or memory 210 via I/O subsystem 220. For example, in one embodiment input device 230 may include tactile input devices such as a computer keyboard, a computer mouse, or a stylus/touchpad interface. Additionally, in one embodiment input device 230 may include video or audio input devices such as a video camera, a still camera, or a microphone, for example. In some embodiments, it is contemplated that input device 230 may include more than one input device, including other types of input devices. Input device 230 may also include hardware necessary to convert the format of the input data to the format required by computer system 200. For example, input device 230 may include analog-to-digital processing hardware to convert audio or video input to a digital format.

Display device 240 may be configured to display output of computer system 200 to one or more users. For example, in one embodiment display device 240 may include a video display terminal such as a computer monitor or a liquid crystal display (LCD) screen, as well as a graphics processor configured to convert output data from the format produced by processor 205 to the format required by the display device. Display device 240 may also include audio output hardware or other output devices such as printers or plotters. In some embodiments, it is contemplated that display device 240 may include more then one display device, including other types of display devices. Further, in some embodiments a given device such as a touch screen, for example, may function as both an input device and a display device. It is contemplated that in some embodiments of computer system 200, such as rack-mount or blade server systems, for example, input devices 230 and/or display devices 240 may be omitted, and the omitted function may instead be handled through network communication device 260.

Storage device 250 may be configured to store data, including program instructions and data, for use during operation of computer system 200. In one embodiment, storage device 250 may be both readable and writable, and may thereby be configured to store data produced by computer system 200 or received from input device 230 or another computer system. For example, storage device 250 may include a magnetic storage device such as a fixed disk drive (also referred to as a hard drive or hard disk), a removable magnetic disk drive, or a tape drive. Storage device 250 may also include a rewritable optical storage device such as a recordable or rewritable compact disk (CD-R or CD-RW) or a recordable digital video disk (DVD), for example. In other embodiments, storage device 250 may be a read-only optical device such as a CD-ROM or DVD-ROM. In still other embodiments, mass storage device 250 may be a solid-state storage device such as a removable flash RAM device, for example. In some embodiments, it is contemplated that storage device 250 may include more than one storage device, including other types of storage devices.

Network interface device 260 may be configured to transmit data from computer system 200 to other computer systems as well as to receive data from other computer systems via a communication network. In one embodiment, network interface device 260 may be physically coupled to one or more other computer systems and may implement a networking standard such as Ethernet, for example. Alternatively, network interface device 260 may implement a fiber optic communication network protocol, or it may implement a telephony protocol and function as a dial-up modem, for example. In another embodiment, network interface device 260 may use a wireless networking protocol to interface with one or more other computer systems, such as a wireless Ethernet protocol (e.g., Wi-Fi), the Bluetooth standard, or a wireless telephony standard. In some embodiments, it is contemplated that network interface device 260 may include more than one network interface implementing more than one type of interface protocol, including other types of devices and protocols.

It is noted that in some embodiments of computer system 200, functions of various elements depicted in the illustrated embodiment may be integrated into a single element. For example, in one embodiment, a microcontroller may integrate some or all of the functions of processor 205, memory 210, and I/O subsystem 220. Alternatively, as noted above, in one embodiment input device 230 and display device 240 may be integrated into a single device, for example. Further, it is noted that in some embodiments, computer system 200 may omit one or more of input device 230, display device 240, mass storage device 250, and network interface device 260.

Various embodiments of computer system 200 may correspond to various types of well-known computing devices, depending on the configuration of the various components of computer system 200. For example, an embodiment of computer system 200 that includes a high-performance processor 205, a large quantity of memory 210, a large quantity of hard disk storage as mass storage device 250, and a high-bandwidth network interface device 260 may be configured to operate as a server computer system. Such a server computer system may further be configured to execute one or more of the software modules illustrated in FIG. 1 or 2, such as database 150 or web server 160, for example.

In other embodiments, computer system 200 may be a desktop or portable computer system or a tablet computer system. A personal digital assistant (PDA) may be an embodiment of computer system 200 configured, for example, to include a touch screen and/or a voice recognition interface as input device 230, a low-power-consumption processor 200, flash NVRAM as memory 210, and a wireless Ethernet interface (e.g., implementing the 802.11 "Wi-Fi" standard) as network interface device 260. A wireless telephony device may also be an embodiment of computer system 200. Various embodiments of such wireless telephony devices may include, for example, an analog or digital "cellular" telephone device implementing a wireless telephony standard such as GSM, TDMA, CDMA, or another standard. The aforementioned embodiments may be configured to execute one or more of the software modules illustrated in FIG. 1 or 2, such as any of applications 110, for example. It is noted that numerous other embodiments of computer system 200 are possible and contemplated.

As noted above, in some embodiments code 215 may correspond to one or more of the software modules illustrated in FIG. 1 or 2. In the illustrated embodiment of computer system 200, code 215 resides in memory 210. Memory 210 may be one embodiment of a computer-accessible storage medium configured to store program instructions and/or data such as included in code 215. However, in other embodiments, the program instructions and/or data included in code 215 may be received, sent or stored upon different types of computer-accessible media. Generally speaking, a computer-accessible medium may include a computer-accessible storage medium or a computer-accessible memory medium such as magnetic or optical media, e.g., disk or CD-ROM included in some embodiments of computer system 20 as mass storage device 250. A computer-accessible storage medium may also include volatile or non-volatile media such as RAM (e.g. SDRAM, DDR SDRAM, RDRAM, SRAM, etc.), ROM, etc, that may be included in some embodiments of computer system 20 as memory 210. Further, a computer-accessible medium may include transmission media or signals such as electrical, electromagnetic, or digital signals, conveyed via a communication medium such as network and/or a wireless link, which may be included in some embodiments of computer system 200 as network interface device 260.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A hardware system, comprising:
   a plurality of hardware computing devices configured to implement:
   a computational resource;
   a plurality of applications configured to utilize said computational resource;
   a metering utility configured to measure utilization of said computational resource by a given one of said plurality of applications; and
   a cost model configured to allocate a first portion of a cost of said computational resource to said given application dependent upon said measured utilization of said computational resource by said given application;
   wherein to allocate the first portion of the cost, the cost model is further configured to:
   determine a total available capacity of said computational resource; and compute a unit cost for said computational resource from said total available capacity and a cost share assigned to said computational resource.

2. The hardware system as recited in claim 1, wherein said cost model is further configured to allocate a second portion of said cost of said computational resource to said given application as a fixed cost not dependent upon said measured utilization of said computational resource by said given application.

3. The hardware system as recited in claim 2, wherein said first and second portions total one hundred percent of said cost, and wherein subject to said totaling, said first and said second portions each comprise from zero percent to one hundred percent of said cost.

4. The hardware system as recited in claim 1, wherein said cost model includes direct and indirect costs of providing said computational resource.

5. The hardware system as recited in claim 1, wherein said computational resource is one of a plurality of computational resources, and wherein said cost model is further configured to distribute at least a portion of a total cost of providing said plurality of computational resources among said plurality of computational resources, such that each of said computational resources bears a respective cost share of said at least a portion of said total cost.

6. The hardware system as recited in claim 5, wherein said cost model is further configured to:
   determine a respective total available capacity of each of said computational resources; and
   compute a respective unit cost for each of said computational resources from said respective total available capacity and said respective cost share.

7. The hardware system as recited in claim 6, wherein determining said respective total available capacity includes applying a respective expected resource utilization factor.

8. The hardware system as recited in claim 1, wherein said first portion of said cost is dependent upon a quality of service of said given application.

9. The hardware system as recited in claim 1, wherein said computational resource includes a processor, a storage device, or a network communication device.

10. A method implemented on computer hardware, comprising:
    a plurality of applications utilizing a computational resource;
    measuring utilization of said computational resource by a given one of said plurality of applications; and
    allocating a first portion of a cost of said computational resource to said given application dependent upon said measured utilization of said computational resource by said given application, wherein said allocating comprises:
    determining a total available capacity of said computational resource; and
    computing a unit cost for said computational resource from said total available capacity and a cost share assigned to said computational resource.

11. The method as recited in claim 10, further comprising allocating a second portion of said cost of said computational resource to said given application as a fixed cost not dependent upon said measured utilization of said computational resource by said given application.

12. The method as recited in claim 11, wherein said first and second portions total one hundred percent of said cost, and wherein subject to said totaling, said first and said second portions each comprise from zero percent to one hundred percent of said cost.

13. The method as recited in claim 10, wherein said cost includes direct and indirect costs of providing said computational resource.

14. The method as recited in claim 10, wherein said computational resource is one of a plurality of computational resources, and further comprising distributing at least a portion of a total cost of providing said plurality of computational resources among said plurality of computational resources, such that each of said computational resources bears a respective cost share of said at least a portion of said total cost.

15. The method as recited in claim 14, further comprising:
    determining a respective total available capacity of each of said computational resources; and
    computing a respective unit cost for each of said computational resources from said respective total available capacity and said respective cost share.

16. The method as recited in claim 15, wherein determining said respective total available capacity includes applying a respective expected resource utilization factor.

17. The method as recited in claim 10, wherein said first portion of said cost is dependent upon a quality of service of said given application.

18. The method as recited in claim 10, wherein said computational resource includes a processor, a storage device, or a network communication device.

19. A computer-accessible storage medium storing program instructions that when executed implement a method to:
- measure utilization of a computational resource by a given one of a plurality of applications; and
- allocate a first portion of a cost of said computational resource to said given application dependent upon said measured utilization of said computational resource by said given application, wherein to allocate the first portion of the cost, the program instructions are further computer-executable to:
- determine a total available capacity of said computational resource; and
- compute a unit cost for said computational resource from said total available capacity and a cost share assigned to said computational resource.

20. The computer-accessible storage medium as recited in claim 19, wherein the program instructions are further executable to allocate a second portion of said cost of said computational resource to said given application as a fixed cost not dependent upon said measured utilization of said computational resource by said given application.

21. The computer-accessible storage medium as recited in claim 20, wherein said first and second portions total one hundred percent of said cost, and wherein subject to said totaling, said first and said second portions each comprise from zero percent to one hundred percent of said cost.

22. The computer-accessible storage medium as recited in claim 19, wherein said cost includes direct and indirect costs of providing said computational resource.

23. The computer-accessible storage medium as recited in claim 19, wherein said computational resource is one of a plurality of computational resources, and wherein the program instructions are further executable to distribute at least a portion of a total cost of providing said plurality of computational resources among said plurality of computational resources, such that each of said computational resources bears a respective cost share of said at least a portion of said total cost.

24. The computer-accessible storage medium as recited in claim 23, wherein the program instructions are further executable to:
- determine a respective total available capacity of each of said computational resources; and
- compute a respective unit cost for each of said computational resources from said respective total available capacity and said respective cost share.

25. The computer-accessible storage medium as recited in claim 24, wherein determining said respective total available capacity includes applying a respective expected resource utilization factor.

26. The computer-accessible storage medium as recited in claim 19, wherein said first portion of said cost is dependent upon a quality of service of said given application.

27. The computer-accessible storage medium as recited in claim 19, wherein said computational resource includes a processor, a storage device, or a network communication device.

* * * * *